United States Patent [19]

Leutgäb

[11] 4,125,043
[45] Nov. 14, 1978

[54] DEVICE FOR THE CENTERED CLAMPING OF ANNULAR WORKPIECES FOR INTERNAL MACHINING

[75] Inventor: Hermann Leutgäb, Derching, Fed. Rep. of Germany

[73] Assignee: Goetzewerke Friedrich Goetze AG, Burscheid, Fed. Rep. of Germany

[21] Appl. No.: 817,519

[22] Filed: Jul. 20, 1977

[30] Foreign Application Priority Data

Jul. 24, 1976 [DE] Fed. Rep. of Germany ....... 2633432

[51] Int. Cl.² .................. B23B 31/19; B23P 19/04; B23B 31/30
[52] U.S. Cl. ......................................... 82/45; 29/269; 279/4; 408/19
[58] Field of Search ............... 82/45; 408/19, 95, 104, 408/105; 29/269, 156.63; 279/4

[56] References Cited

U.S. PATENT DOCUMENTS

| | | | |
|---|---|---|---|
| 1,292,735 | 1/1919 | Elliott | 29/269 |
| 2,388,871 | 11/1945 | Scarff | 29/269 |
| 2,471,006 | 5/1949 | Olson | 408/19 |
| 2,566,304 | 9/1951 | Bates | 408/19 |
| 3,630,631 | 12/1971 | Becker | 408/19 |

Primary Examiner—Leonidas Vlachos
Attorney, Agent, or Firm—Spencer & Kaye

[57] ABSTRACT

A device for the centered clamping of an annular workpiece or workpiece stack formed of a plurality of annular workpieces, to hold the same in position for the machining of the inner faces thereof, includes first and second axially aligned clamping rings for engaging opposite, radially extending end faces of a workpiece or workpiece stack positioned in a space between the clamping rings; a centering cylinder surrounding the space and having a lead-in chamfer at one edge thereof; and a clamping arrangement for moving the two clamping rings relative to one another. The clamping arrangement comprises a power device actuatable in a clamping direction; a force-transmitting arrangement extending exclusively externally of the centering cylinder and coupling the clamping rings to one another and to the power device; and an axial stop for abutting and arresting the second clamping ring when urged in the clamping direction by the power device with the intermediary of the force-transmitting arrangement, the first clamping ring and the workpiece or workpiece stack for clamping the latter between the first and second clamping rings.

12 Claims, 1 Drawing Figure

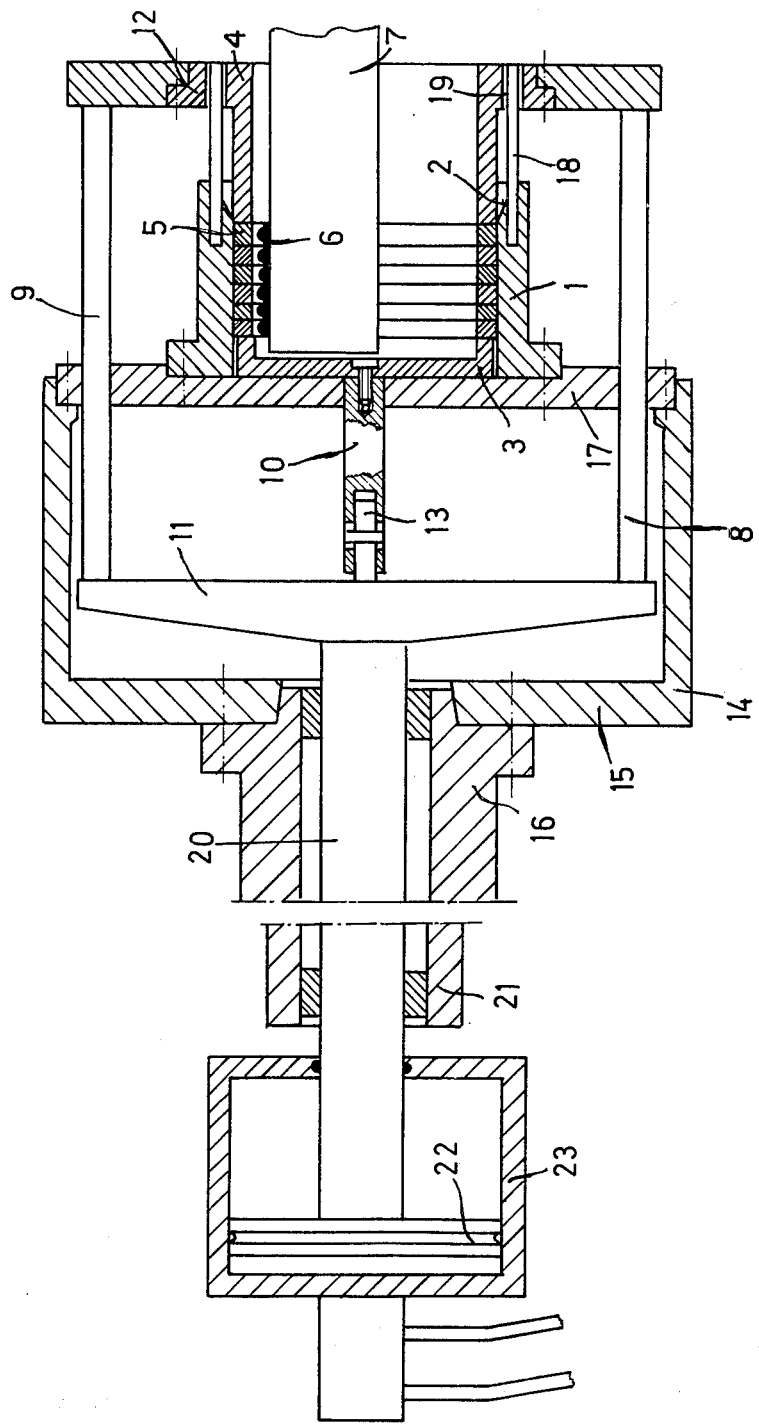

DEVICE FOR THE CENTERED CLAMPING OF ANNULAR WORKPIECES FOR INTERNAL MACHINING

BACKGROUND OF THE INVENTION

This invention relates to a device for the centered clamping of annular workpieces, particularly resilient piston rings, to position them for machining operations to be performed on the internal faces thereof. The device includes two clamping rings adapted to engage, on opposite radial sides, the piston ring or, as the case may be, the piston ring stack, a mechanism to urge the clamping rings axially towards one another and a centering cylinder which surrounds the piston rings and which is provided with a chamfered lead-in edge.

Arrangements for the clamping of a single ring or a ring stack between annular clamping bodies engaging opposite radial sides of the ring(s) to position the latter for performing machining operations on the external or internal circumferential ring faces are generally known. For the centering of the radially resilient piston rings either rigid centering cylinders with a conical (chamfered) lead-in edge (as disclosed, for example, in German Pat. No. 1,014,410) or radially adjustable centering devices (as disclosed, for example, in U.S. Pat. No. 1,897,397) are used.

In German laid-open application (Offenlegungsschrift) No. 2,144,800 there is disclosed a device for the internal machining of piston rings wherein the piston rings are pressed axially into a stationary centering cylinder (having an axial abutment) to thus position the rings for machining the inner circumferential ring surfaces by means of a rotating tool. Additional, resiliently supported ejecting pins are provided for the axial discharge of the piston rings upon completion of the machining. It is a disadvantage of a device of this type that only small-diameter piston rings may be efficiently machined, because the imbalance of the rotating tool is too high in case of large-diameter piston rings and thus the turning tool may not be operated with the maximum cutting speed. It is a further advantage of this device that it is designed for a particular machining operation and cannot be used for other purposes.

The clamping device disclosed in German Pat. No. 1,104,410, on the other hand, may be mounted on any conventional machine tool such as a lathe. While the device disclosed in this German Patent is designed exclusively to position piston rings for an external machining, the device disclosed in German Pat. No. 571,579 may be utilized for both an external and a successive internal machining of the piston rings. In this known structure the axial clamping of the piston ring stack is effected exclusively manually by means of a centrally extending tensioning bolt or at least two tensioning bolts which extend externally of the piston ring stack.

SUMMARY OF THE INVENTION

It is an object of the invention to provide an improved device for the centered clamping of annular workpieces, particularly piston rings which may be coupled to and actuated by a conventional machine tool, preferably a lathe.

The basic, initial structure which incorporates the inventive improvement includes a cylinder for centering the workpieces as well as two clamping rings for the axial clamping of the workpieces within the centering cylinder. The latter is provided with a lead-in cone (chamfered edge) for facilitating the introduction of the workpieces into the centering cylinder.

The above objects as well as others to become apparent as the specification progresses, are accomplished by the invention, according to which, briefly stated, the device for the centered clamping of an annular workpiece or workpiece stack formed of a plurality of annular workpieces, to hold the same in position for the machining of the inner faces thereof, includes first and second axially aligned clamping rings for engaging opposite, radially extending end faces of a workpiece or workpiece stack positioned in a space between the clamping rings; a centering cylinder surrounding the space and having a lead-in chamfer at one edge thereof; and a clamping arrangement for moving the two clamping rings relative to one another. The clamping arrangement comprises a power device actuatable in a clamping direction; a force-transmitting arrangment extending exclusively externally of the centering cylinder and coupling the clamping rings to one another and to the power device; and an axial stop for abutting and arresting the second clamping ring when urged in the clamping direction by the power device with the intermediary of the force-transmitting arrangement, the first clamping ring and the workpiece or workpiece stack for clamping the latter between the first and second clamping rings.

Advantageously, the force-transmitting arrangement comprises at least three axially parallel rods which are connected with one another by a transverse member. Of the three rods, two diametrically oppositely located rods are attached to one clamping ring, while the third, centrally extending rod is attached to the other clamping ring. In this manner a workpiece or a workpiece stack may be axially clamped between the two clamping rings inside the centering cylinder by means of an axial tensioning force exerted on the transverse member. For an accurate machining of the workpiece it is of significance that the force is applied on both sides to the workpiece or, as the case may be, the workpiece stack.

For the axial clamping preferably a hydraulic or pneumatic power cylinder is used, the piston rod of which is connected with the transverse member that carries the axially parallel rods.

According to a further feature of the invention, the clamping ring which is connected with the transverse member by means of the central rod is a circular disc having an axially extending circumferential rim, so that the central rod may be affixed to the center of the disc, while the radially extending disc face around the central rod may be urged against the axial abutment connected with the centering cylinder and the disc rim may serve as the backup member for the workpieces.

The clamping ring which is connected with the transverse member by means of the diametrically opposite rods is preferably of sleeve shape which has an outwardly oriented, radially extending flange to which the rod ends are secured so that the machining tool may be freely introduced through the sleeve for performing the machining of the inner workpiece faces.

In accordance with a further advantageous feature of the invention, the centering cylinder has, in the zone of the lead-in chamfer, at least two circumferentially distributed, axially projecting centering pins, the inner distance of which is smaller than the external diameter of the workpieces (in their relaxed state). In this manner it is ensured that beside an automatic introduction of the workpieces by means of gripping devices or the like, a manual feeding is possible since the centering pins are then adapted to position the workpieces in front of the centering cylinder. The radial flange of the clamping sleeve has two axial passages for receiving the centering pins, thus making unnecessary a more expensive resilient accommodation of the centering pins in the centering cylinder.

In accordance with a further feature of the invention, particularly in case the device is used on a lathe, the transverse member is arranged within a preferably cylindrical housing as a safety precaution to prevent accidents caused by the rotary components. In such an arrangement the radially extending end face of the housing is connectable with the lathe spindle, while the other radially extending end face serves for receiving the centering cylinder and is, at the same time, used as the axial abutment for the disc-shaped clamping ring.

According to a further feature of the invention, the piston rod coupled with the transverse member extends through a hollow work spindle of a turning machine, such as a lathe and, at the other end of the work spindle, remote from the clamping device, it projects into a clamping cylinder known by itself.

BRIEF DESCRIPTION OF THE DRAWING

The sole FIGURE illustrates a preferred embodiment of the invention in longitudinal section.

DESCRIPTION OF THE PREFERRED EMBODIMENT

Turning now to the FIGURE, the device according to the invention comprises a centering cylinder 1 having a chamfer (lead-in cone) 2, a clamping ring 3, constituted by a disc provided with an axially extending circumferential rim and a clamping ring 4 constituted by a flanged sleeve. Between the clamping rings 3 and 4 there is axially clamped a workpiece stack formed of a plurality of radially resilient piston rings 5. The latter are held and positioned in the centering cylinder 1 for machining their inner circumferential faces by means of a machine tool comprising a tool shaft 7 and tool bits 6 secured thereto. For the actuation of the clamping rings 3 and 4 there are provided three rods 8, 9 and 10, of which the rods 8 and 9 are arranged diametrically oppositely and axially parallel externally of the centering cylinder 1, whereas the third rod 10 extends in alignment with the axis of the device, also externally of the centering cylinder 1. The three rods are connected to one another by means of a transverse member 11. While the tension rods 8 and 9 are affixed to the radial flange 12 of the clamping ring 4, the central rod 10 carries the clamping ring 3. The central rod 10 may move relatively to the transverse member 11 to permit a relative motion between the clamping rings 3 and 4. For this purpose, that part of the central rod 10 which is oriented towards the transverse member 11 has an axially hollow portion, into which slidably fits a bar 13 affixed to the transverse member 11. The length of the hollow axial portion provided in the central rod 10 and the length of the bar 10 are so designed that during operation — as will be described later — the bar 10 may move away from the transverse member sufficiently to permit an easy insertion of the maximum desired number of piston rings between the clamping rings 3 and 4. Thus, the workpiece stack may be unclamped to a defined extent. The transverse member 11 is accommodated in a cylindrical housing 14, one radially extending end wall 15 of which is affixed (for example, by bolts) to the work spindle 16 of a lathe whereas the other, opposite end wall 17 serves as an axial abutment or stop for the clamping ring 3 and carries the centering cylinder 1. The latter has in the zone of the chamfer 2 three axially oriented, circumferentially uniformly distributed centering pins 18 for the preliminary centering of manually fed workpieces. In the clamped condition of the workpieces the centering pins 18 extend in axial passages 19 provided in the flange 12 of the clamping ring 4.

The actuation of the tensioning device is effected by means of a piston rod 20 which extends through the hollow work spindle 16. The piston rod 20 is connected adjacent the outer end 21 of the work spindle 16 with the piston 22 of a hydraulic or pneumatic power cylinder (clamping cylinder) 23 conventionally used in lathes. It is feasible to arrange the power cylinder 23 within the cylindrical housing 14.

In the description that follows, an operational cycle of the above-described centering and clamping device will be set forth.

Let it be assumed that the machining of the inner cylindrical surfaces of the piston rings constituting a workpiece stack 5 has just been completed and the turning tool 6, 7 has been withdrawn.

To release the still clamped workpiece stack 5, the power cylinder 23 is actuated such that the piston 22 is caused to move towards the right, as viewed in the FIGURE. Thus, the piston rod 20, the transverse member 11, the tie rods 8 and 9 as well as the clamping ring 4 will move towards the right as a unit with the piston 22. During the initial phase of this rightward movement, the bar 13, rigidly affixed to the transverse member 11, slides into the axially hollow rod 10 and therefore rod 10 and the clamping ring 3 affixed thereto remain stationary. As a result, the clamping ring 4 moves away from the clamp ring 3 and thus the workpiece stack is unclamped.

As the piston 22 and the above-enumerated components continue their rightward movement, an abutment between the rod 10 and the transverse member 11 or, as the case may be, between the rod 10 and the bar 13, occurs. Thereafter, the rod 10 and thus the clamping ring 3 also move towards the right as a unit with the piston 22. During this phase of the rightward movement of the components driven by the piston 22, the clamping ring 3 pushes the unclamped workpiece stack 5 towards the right, out of the centering cylinder 1. During this motion, the flange 12 of the clamping ring 4 moves away from the right-hand terminus of the centering pins 18 and, during the final phase of the rightward movement, the clamping ring 4 as well as the workpiece stack 5 move beyond the free right-hand terminus of the centering pins 18. Thereafter, the piston 22 is caused to stop and an appropriate means, such as a grasping device, moves the finished workpiece stack 5 out of the zone of the clamping rings 3 and 4 in a radial direction.

The charging of the apparatus with a new workpiece or workpiece stack to be internally machined and the tensioning thereof by the centering and clamping device occurs in an order reverse to the workpiece discharge operation described above.

Thus, a grasping device brings the workpiece or workpiece stack to be machined in a radial direction between the two open clamping rings 3 and 4, whereupon the power cylinder 23 is energized to cause the piston 22 to move towards the left.

During the initial phase of the leftward movement of the components, the rod 10 and thus the clamping ring 3 will remain stationary as the transverse member 11, by virtue of the relatively movable connection with the rod 10, moves away from the latter. Consequently, during this initial phase of the leftward movement, the clamping ring 4 approaches the clamping ring 3 until an abutment between the clamping ring 4 and the workpiece stack 5 occurs. From that moment on, the clamping ring 4 pushes, with the intermediary of the workpiece stack 5, the clamping ring 3 and the rod 10 towards the left as the leftward movement of the piston 22 continues. During this phase of the closing motion, the piston rings forming the workpiece stack 5 are, one-by-one, introduced into the centering cylinder 1. The piston rings which are out-of-round or whose outer diameter is greater than the inner diameter of the centering cylinder 1, are forced into the centering cylinder 1 by virtue of the cooperation between the axially moving clamping ring 4 and the camming effect of the chamfer 2 provided at the centering cylinder 1. The piston rings are thus compressed to the desired diameter and are maintained in position by the restraining inner wall of the centering cylinder 1.

Subsequently, the clamping disc 3 reaches the end of its leftward travel by abutting against the stop 17. Thereafter, in the terminal phase of the leftward movement of the power piston 22, the clamping proper of the workpiece stack 5 takes place as the clamping ring 4 is forced towards the now immobilized clamping ring 3. Upon reaching the predetermined clamping force, the piston 22 is maintained in position in the power cylinder 23 for maintaining the predetermined clamping force exerted on the workpiece stack 5. Thereafter, the turning tool 6, 7 may be introduced through the clamping ring 4 into the workpiece stack 5 for performing the internal machining thereon.

The above-described device has the advantage that without particular adaptor equipment or without reconstruction it may be mounted in a simple manner on any machining tool. According to a further embodiment, the drive piston for the transverse member may be accommodated in the transverse housing.

It will be understood that the above description of the present invention is susceptible to various modifications, changes and adaptations, and the same are intended to be comprehended within the meaning and range of equivalents of the appended claims.

What is claimed is:

1. In a device for the centered clamping of an annular workpiece or workpiece stack formed of a plurality of annular workpieces, to hold the same in position for the machining of the inner faces thereof; the device including first and second axially aligned clamping rings for engaging opposite, radially extending end faces of a workpiece or workpiece stack positioned in a space between the clamping rings; a centering cylinder surrounding the space and having a lead-in chamfer at one edge thereof; and a clamping means for moving the two clamping rings relative to one another; the improvement wherein said clamping means comprises (a) power means including means for actuating the power means in a clamping direction;
   (b) force-transmitting means extending exclusively externally of said centering cylinder and coupling said clamping rings to one another and to said power means; said force-transmitting means having
      (1) a transverse member;
      (2) first and second rods each affixed to said transverse member and to said first clamping ring; said first and second rods being arranged diametrically oppositely relative to one another with respect to said first clamping ring; and
      (3) a third rod being in axial alignment with said clamping rings and being coupled to said transverse member and said second clamping ring; and
   (c) an axial stop means for abutting and arresting said second clamping ring when urged in said clamping direction by said power means with the intermediary of said force-transmitting means, said first clamping ring and the workpiece or workpiece stack for clamping the latter between said first and second clamping rings.

2. A device as defined in claim 1, wherein said second clamping ring is disc-shaped and has a circumferential rim oriented axially towards said first clamping ring; said circumferential rim being arranged to engage an end face of a workpiece.

3. A device as defined in claim 1, wherein said first clamping ring is constituted by a sleeve having a radially extending flange.

4. A device as defined in claim 1, further comprising a plurality of circumferentially distributed, axially projecting centering pins attached to said centering cylinder in the zone of said lead-in chamfer.

5. A device as defined in claim 4, wherein said first clamping ring is constituted by a sleeve having a radially extending flange to which said first and second rods are affixed; furthercomprising means defining, in said flange, separate, axially parallel openings each aligned with a separate one of said centering pins; each opening constituting a passage for slidably receiving the respective centering pin.

6. A device as defined in claim 1, wherein said power means comprises a fluid pressure operated power cylinder and a piston slidably arranged in said power cylinder; said force-transmitting means further comprising a piston rod connecting said piston with said transverse member.

7. A device as defined in claim 1, wherein said first clamping ring is constituted by a sleeve having a radially extending flange; said first and second rods being affixed to said flange.

8. A devices as defined in claim 1, further comprising a cylindrical housing having opposite, radially extending first and second external end faces and accommodating said transverse member and said power means; means for securing said first external end face of said cylindrical housing to a work spindle of a lathe; means for securing said centering cylinder to said second external end face of said cylindrical housing; the portion of said second external end face of said cylindrical housing surrounded by said centering cylinder constituting said axial stop means.

9. A device as defined in claim 1, further comprising means allowing relative axial motion between said second clamping ring and said transverse member.

10. A device as defined in claim 9, wherein said means allowing relative axial motion includes means between said third rod and said transverse member for effecting an axial motion of said second clamping ring together with said first clamping ring in a direction away from said stop means upon exerting a force to said transverse member in a direction opposite to the clamping direction.

11. A device as defined in claim 1, further comprising a cylindrical housing having opposite, radially extending first and second external end faces and accommodating said transverse member; means for securing said first external end face of said cylindrical housing to a work spindle of a lathe; means for securing said centering cylinder to said second external end face of said cylindrical housing; a portion of said second external end face of said cylindrical housing surrounded by said centering cylinder constituting said axial stop means.

12. A device as defined in claim 11, wherein said power means is constituted by a clamping cylinder of the lathe; said force-transmitting means further comprises a piston rod connected to said transverse member and extending axially through the lathe spindle into the clamping cylinder thereof.

* * * * *